T. J. WILLIAMS.
CHAIN LINK OR CHAIN.
APPLICATION FILED NOV. 20, 1908.
925,407.
Patented June 15, 1909.
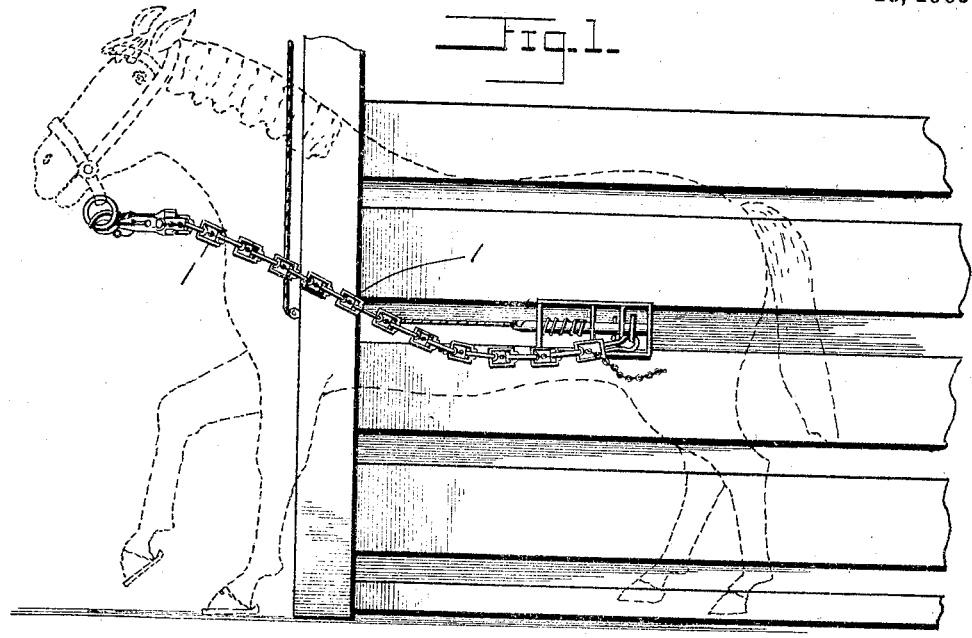
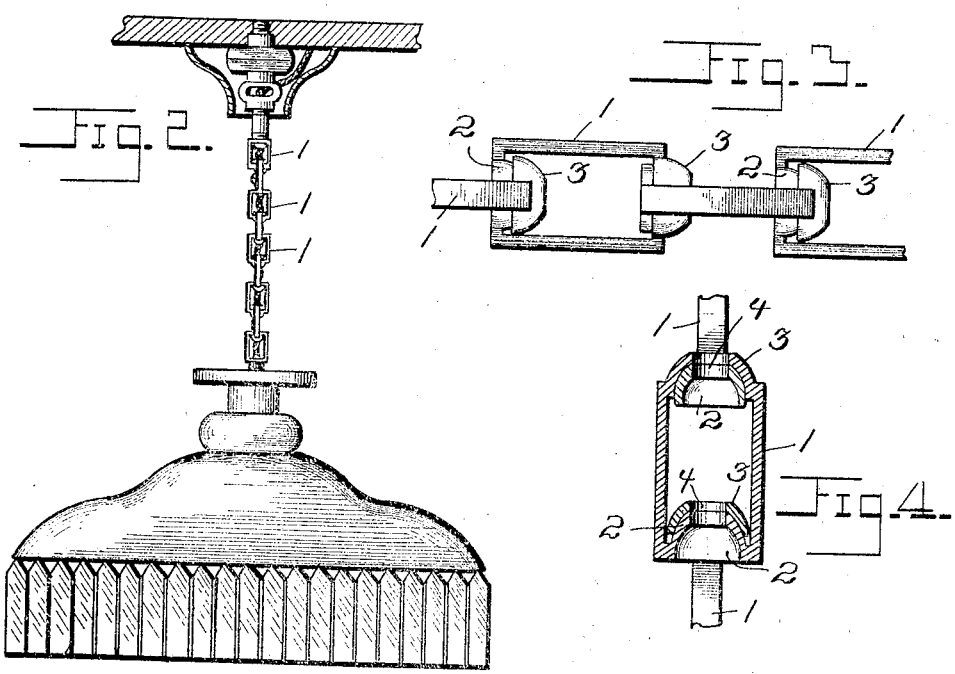
Witnesses
Inventor
Thomas J. Williams.
By E. E. Vrooman,
his Attorney.

UNITED STATES PATENT OFFICE.

THOMAS J. WILLIAMS, OF WASHINGTON, DISTRICT OF COLUMBIA.

CHAIN-LINK OR CHAIN.

No. 925,407.      Specification of Letters Patent.      Patented June 15, 1909.

Application filed November 20, 1908. Serial No. 463,640.

*To all whom it may concern:*

Be it known that I, THOMAS J. WILLIAMS, a citizen of the United States, residing at Washington, District of Columbia, have invented certain new and useful Improvements in Chain-Links or Chains, of which the following is a specification, reference being had therein to the accompanying drawing.

The present invention comprises certain new and useful improvements in chains whereby the latter may be used both as a protector and a guide for an inclosed chain or cable, so as to adapt the chain for a great variety of uses.

In carrying out the objects of the invention generally stated above, it will of course, be understood that the same is susceptible of a wide range of details and structural arrangements, a preferred and practical embodiment of which is shown in the accompanying drawings, wherein—

Figure 1 is a detail view of the invention showing the same used in connection with an automatically operating releasing device for fire engine houses. Fig. 2 is a similar view showing the invention used for suspending lamps and also serving as a guide and protector for the feed wire of the same. Fig. 3 is a side elevation of a portion of the improved chain, showing the universal connection between each link thereof. Fig. 4 is a central longitudinal sectional view taken through one of the links and a portion of the adjoining links.

It is to be understood at the outset, that the two uses of the improved chain illustrated in the drawings, is but a few of the many uses to which the invention may be put.

Referring to said drawings, the improved chain may be composed of a plurality of open links 1, the ends of which are transversely rounded and widened to provide, respectively, a socket member and a ball member, as indicated at 2 and 3, the rounded surface or socket portion 3 projecting beyond the end of the link and the rounded surface or ball portion 2 projecting toward the interior of the link, as is shown more clearly in Figs. 3 and 4 of the accompanying drawings. The ball and the socket portions of the links are preferably integral therewith, and each is provided with an opening 4, which aline, so as to permit a chain, cable or the like to be passed entirely through the chain, as is shown in the two examples of uses to which the invention may be applied in Figs. 1 and 2.

The ball and socket portions of the ends of the links are rounded, the ball ends being of a smaller size than the concaved ends, so that when the links are together, the ball end of each link will fit within the socket end of the adjacent link, as shown in Figs. 3 and 4, to form a ball and socket joint between each link, which permits of the said links having a relative movement to impart the necessary flexibility to the chain.

It will be seen from the foregoing, that as the ball members and the socket members of the links are comparatively wide they project well beyond each side of the link, and thereby provide an enlarged bearing surface which permits the links to have the desired relative movements.

As has been before stated the chain may be put to a large number of uses both as a guide and a protector, as it will be readily seen that through the described universal connection between each link and the alined openings through the same, the chain, cable, or wire that is inclosed by said links will be thoroughly protected, and where a movement of the inclosed chain, or the like, relative to the protector and guide is desired, the alined openings through the links permit the same to be readily had.

Claims:—

1. A chain link having its ends transversely widened and provided, respectively, with an inwardly-projecting rounded surface and an outwardly-projecting rounded surface.

2. A chain-link having its ends provided respectively with an inwardly-projecting, rounded surface, and an outwardly-projecting, rounded surface, the rounded surfaces provided with alined openings.

3. A chain comprising open links, each link provided with side arms terminating in enlarged, transversely-widened, and rounded ends, one end projecting beyond its link and forming a socket member, the other end projecting inwardly of its link and forming a ball member, said socket member and said ball member having openings through them which are in alinement, whereby, when said links are assembled, the ball member of one link engages with the socket member of the other link and the openings through said members form a guiding channel extending through the chain.

In testimony whereof I hereunto affix my signature in presence of two witnesses.

THOMAS J. WILLIAMS.

Witnesses:
C. A. BAKER,
G. A. COTTER.